June 28, 1955  D. L. WAUGH  2,711,778
V-BELTS AND THE METHOD OF MAKING THE SAME
Filed Oct. 25, 1952

INVENTOR.
DALE WAUGH
BY
ATT'Y.

United States Patent Office 2,711,778
Patented June 28, 1955

2,711,778

V-BELTS AND THE METHOD OF MAKING THE SAME

Dale L. Waugh, Dayton, Ohio, assignor to The Dayton Rubber Company, a corporation of Ohio Application October 25, 1952, Serial No. 316,827

10 Claims. (Cl. 154—4)

My invention relates to flexible V-type belts and particularly to the material with which they are manufactured.

A recurring problem in the art of V-type belts has been that of "bowing" which is the lateral displacement of the belt as it passes from one pulley to another. Bowing is sometimes caused by a slight angularity of the rotational axes of the pulleys over which the belt is traveling, in which case the obvious remedy is to bring the pulleys into planar alignment. Even when the pulleys are properly aligned, however, it often develops that a belt will traverse an arcuate path between them. It is this type of bowing with which my invention is concerned.

Where two pulleys are in planar relationship it can readily be seen that bowing of the belt passing between them will cause the belt to bear more heavily on one side of the pulley than the other, both as it leaves the one pulley and as it enters upon the second. Such relationship between belt and pulleys is undesirable in that a twisting effect is imparted to the pulleys, the load is unevenly distributed throughout the belt, and the increased friction on the driving surfaces causes excessive wear and heat formation.

It is my belief that this bowing and resultant uneven distribution of bearing force is also a cause of objectionable squeaking noises of belt and pulley contact.

Another problem in the field of V-belt is that of belt failure at points where the various laminations of belt material have been spliced together.

It is an object of my invention to provide a flexible belt for satisfactory operation in a pulley drive mechanism.

It is another object of this invention to provide a belt that will operate in a pulley drive mechanism without tending to bow.

It is a further object of this invention to provide a method for the manufacture of such belts incorporating a method for producing a longer lasting splice.

Figure 1:
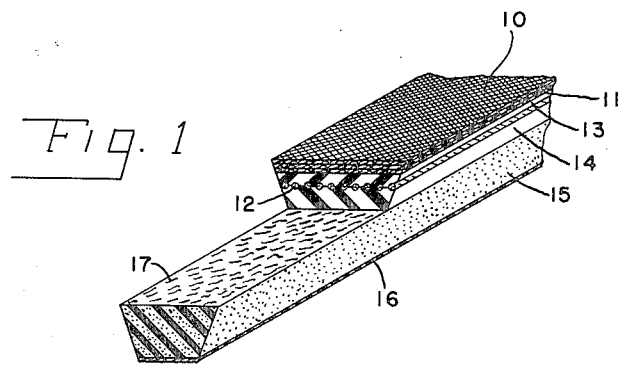
Figure 1 is a perspective view in partial vertical and horizontal section of a raw edged belt embodying the principles of my invention.

Referring now to Figure 1, the raw edged belt 10 is composed of a tension section of layers of rubberized bias-laid fabric 11; a neutral axis section of inextensible strength cords 12 embedded between cushion layers 13 and 14 of soft rubber-like material; and a compression section of fiber-reinforced gum stock 15, along the inner surface of which is laid a base layer of bias-cut rubberized fabric 16.

I have discovered that the above-described bowing effect is directly related to the twist of the neutral axis cords 12 and the direction in which they are wound about the mandrel in building up the sleeve from which the belts are to be cut. Accordingly, for a given type of cord wound about a building mandrel in a given manner, the bowing tendencies of the belt will be substantially the same and can be predicted.

I have also discovered that the bowing tendencies of a belt are affected by the angle at which the reinforcing fibers 17 of the compression section intersects the longitudinal axis of the belt. Consequently, it has developed that by properly correlating the angle of the compression section fibers 17 with the twist and winding of the neutral axis cords 12, the bowing tendencies of each will negative the bowing tendencies of the other and bowing will be substantially reduced in the final product.

In a particular application employing a neutral axis cord of 2200 denier yarn having 980 plies to the strand and five strands to the cable with a Z ply twist of 6.9 and an S cable twist of 2.7, in which the cord is wound about the mandrel so as to form 20 convolutions per axial inch, I have eliminated bowing by laying the fiber reinforced compression stock so that the fibers lie at an angle of 45° with the longitudinal axis of the belt.

Figure 2:
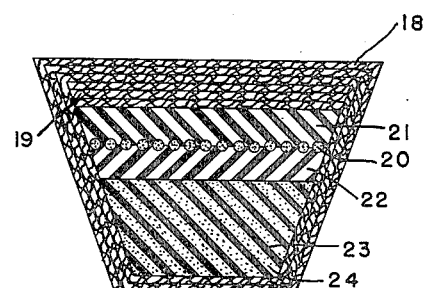
Figure 2 is an enlarged cross section of a wrapped or covered belt embodying the principles of my invention.

In Figure 2, the core of the wrapped belt is similar to the raw edged construction above, being composed of a tension section 19 of rubberized bias-laid woven fabric, a continuously wound strength cord 20 embedded between rubber cushion layers 21 and 22, and a compression section 23 of rubber composition which is loaded with fibers 24 in substantially parallel relationship obliquely disposed to the longitudinal axis of the belt. In this form of my invention, however, the base fabric layer 16 is omitted and a cover of bias-cut rubberized fabric 18 is applied in the conventional manner.

Figure 3:
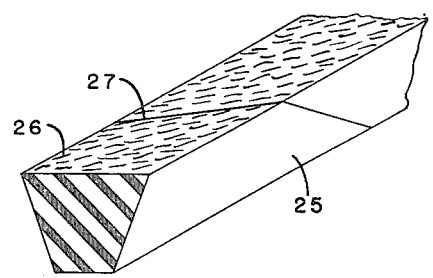
Figure 3 is a perspective view of the compression section of a belt of this invention showing a preferred type of splice.

In Figure 3 is shown a fiber reinforced gum rubber compression section 25 of a typical belt of my invention and the manner of splicing the ends of the same which I have found to prevent separation at the splice. In keeping with the heretofore described features of my invention, the fibers 26 reinforcing the gum rubber are placed at an angle to the longitudinal axis of the belt. In making my splice 27, I cut the ends of the compression stock so that the cut edges will be parallel with the reinforcement fibers. Thus, when the two cut edges are brought together, their closure or splice 27 will be on the bias and intersect the longitudinal axis of the belt at an angle equal to that at which the fibers lie. It is to be noted that, in keeping with the customary practice, the joined ends in Figure 3 are also shown to have been beveled; i. e., cut on an angle to the vertical plane.

In the manner of all beveled bias splices, the above-described joint allows a joining surface larger than that afforded by a square end cut. Because the splice 27 is at an angle to the longitudinal and load carrying axis of the belt, the load carrying force exerts a shearing stress upon the contiguous surfaces rather than a purely tension stress as would be the case if the splice were at right angles to the load carrying axis. Since the fibers 26 reinforce the gum stock in the direction of the splice 27, the shear stress is evenly distributed over the entire joint area thereby reducing unit shear stress and joint failure is accordingly less likely to result.

While the preferred angularity of the reinforcing fibers in the embodiment of my invention above described was one of 45° with the load carrying axis of the belt, I do not confine my invention to such an angle. In the event that a greater cross-wise belt rigidity be required, the angle of the fibers should be increased so that they lie more nearly perpendicular to the belt edges to reinforce the same in the manner disclosed in Freedlander Patent No. 1,874,490. In many applications, there will be necessary a compromise angle such that the belt will have some anti-bowing tendencies and will, at the same time, offer increased resistance to lateral compression. Such compromise angles of fibers with load carrying belt axis may range from 30° to 60°. Whatever the angle may be, a desirable joint of the type described above may be obtained by cutting the edges to be joined on a line parallel with the compression stock fibers.

The preparation of the compression stock of my invention follows the procedure outlined in the above-mentioned Freedlander Patent No. 1,874,490. After the fibers are mixed with the vulcanizable material and the mixture is passed through calender rolls so as to bring the fibers into substantially parallel relation, the gauged material is cut into widths corresponding to the width of the belt roll from which individual belts will be cut. In cutting these belt roll widths, the material should be severed on parallel lines at an angle to the alignment of the reinforcing fibers, said angle being equal to the desired angle between the longitudinal axis and reinforcing fibers in the finished belt.

It is to be understood that the above-detailed description is solely for illustrative purposes and is not intended to limit the scope or the principles of my invention herein disclosed, or the scope of the subjoined claims.

I claim:

1. A flexible belt comprising a tension section, a neutral axis section, and a compression section, said compression section being composed of a vulcanizable rubber compound reinforced with fibers obliquely disposed to the longitudinal axis of said belt.

2. A belt according to claim 1 wherein the angle of obliquity of said fibers to said longitudinal axis is from 30 to 60 degrees.

3. A belt according to claim 1 wherein the angle of obliquity of said fibers to said longitudinal axis is 45 degrees.

4. A flexible belt in which the innermost section is composed of a vulcanizable rubber compound, and interspersed therein, a plurality of fibers in substantially parallel relation obliquely disposed to the load carrying axis of the belt.

5. A load carrying flexible material comprising a vulcanizable rubber compound, and interspersed therein, a plurality of substantially parallel fibers obliquely disposed to the load carrying axis.

6. A belt according to claim 4 in which the said innermost section is joined along edges lying parallel to said obliquely disposed fibers.

7. A flexible belt comprising a tension section of a plurality of superimposed layers of bias-laid rubberized fabric, a neutral axis section of longitudinal cords embedded in layers of rubber material, and a compression section of rubber material interspersed with a plurality of substantially parallel fibers obliquely disposed to the longitudinal axis.

8. A belt according to claim 7 wherein the end sections of said compression section are joined along a line parallel to said obliquely disposed fibers.

9. In the manufacture of a flexible belt consisting in part of rubber material, that improvement which comprises mixing fibers with such rubber material, calendering this mixture to bring the fibers into substantially parallel relationship in a gauged layer, dividing said layer into widths by cutting at an oblique angle to the parallel fibers and placing such widths in the belt construction with the cut edges lying parallel to the load carrying axis of the belt.

10. In the manufacture of a belt having a compression section of fiber-reinforced rubber material wherein the fibers are parallel and obliquely disposed to the load carrying axis of the belt, that improvement which comprises splicing the compression section by cutting said rubber material on a line parallel with said obliquely disposed parallel fibers and permanently joining the edges thus cut.

References Cited in the file of this patent

UNITED STATES PATENTS

| | | |
|---|---|---|
| 1,706,367 | Tolman | Mar. 19, 1929 |
| 2,061,918 | Nanfeldt | Nov. 24, 1936 |
| 2,281,148 | Freedlander | Apr. 28, 1942 |
| 2,516,779 | Lesesne | July 25, 1950 |